United States Patent [19]
Tsunoda

[11] Patent Number: 5,369,799
[45] Date of Patent: Nov. 29, 1994

[54] RADIO PAGER WITH VARIABLE GAIN SETTING CONTROLLED ACCORDING TO PRESENCE AND ABSENCE OF SYNC CODES

[75] Inventor: Kazuyuki Tsunoda, Tokyo, Japan

[73] Assignee: Nec Corporation, Tokyo, Japan

[21] Appl. No.: 904,018

[22] Filed: Jun. 25, 1992

[30] Foreign Application Priority Data

Jun. 25, 1991 [JP] Japan ................... 3-153551

[51] Int. Cl.$^5$ .................. H04B 1/06; H04Q 3/02
[52] U.S. Cl. ................. 455/38.3; 455/234.1; 455/254
[58] Field of Search ......... 455/38.3, 38.2, 38.1, 455/295, 308, 309, 219, 254, 234.1, 234.2, 239.1, 250.1; 340/825.44

[56] References Cited

U.S. PATENT DOCUMENTS 4,961,073 10/1990 Drapac et al. ............ 455/38.3

FOREIGN PATENT DOCUMENTS 2223146 3/1990 United Kingdom ......... 455/254

Primary Examiner—Curtis Kuntz
Assistant Examiner—Thanh C. Le
Attorney, Agent, or Firm—Sughrue, Mion, Zinn, Macpeak & Seas

[57] ABSTRACT

A radio pager has a variable gain adjustable to high setting for normal reception or low setting at which the strength of intermodulation products is reduced in relation to the strength of a desired signal. A sync code contained in a received signal is detected to establish synchronization and a sync-absence signal is generated if it is not detected during a time interval in which it is expected to occur. The pager is initially switched to the high gain setting. In response to a first generation of the sync-absence signal, the pager recognizes that the desired signal is severely affected by intermodulation products and switches to the low gain setting so that the signal-to-noise ratio of the desired signal is improved. In response to a second generation of the sync-absence signal, the pager recognizes that its amplification gain is not sufficient and switches to the high gain setting to resume normal reception.

6 Claims, 4 Drawing Sheets

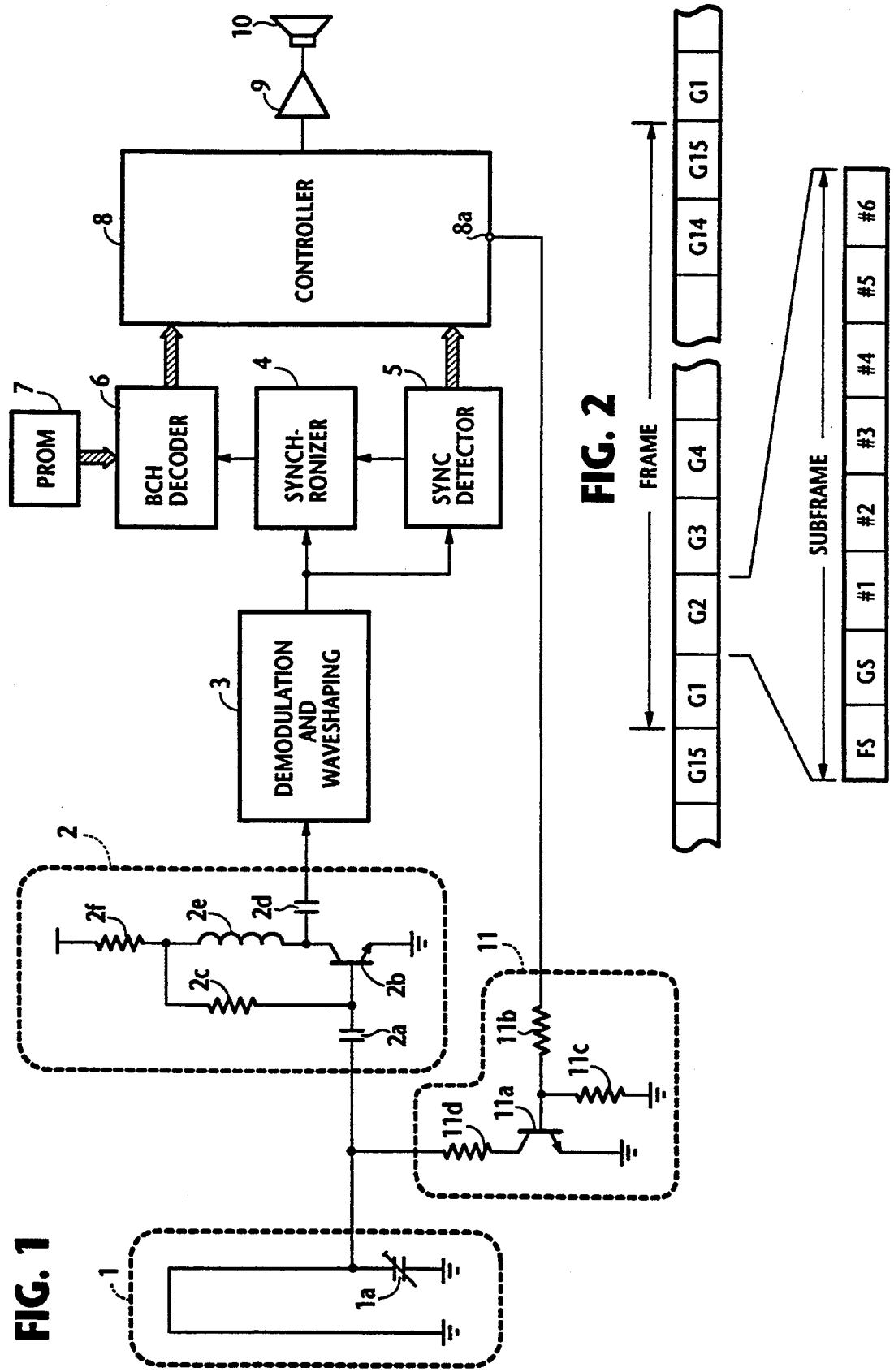

RADIO PAGER WITH VARIABLE GAIN SETTING CONTROLLED ACCORDING TO PRESENCE AND ABSENCE OF SYNC CODES

BACKGROUND OF THE INVENTION

The present invention relates generally to radio pagers, and more specifically to a reduction of the effect of intermodulation products for radio pagers located in areas where signals from different paging systems coexist.

In service areas that are covered by radio paging systems of different telecommunications operating entities, there is a high likelihood of mutual interference in bordering areas. Due to inherent nonlinear characteristics of radio pagers, intermodulation products are produced by pagers located in such areas. In a worst case the desired signal is suppressed by the intermodulation products, particularly by the third order intermodulation product which accounts for a substantial proportion of the total IM products.

SUMMARY OF THE INVENTION

It is therefore an object of the present invention to provide a pager which is less adversely affected by intermodulation products.

According to a broader aspect of the present invention, the radio pager of this invention comprises a receiver for receiving a signal at one of high and low gain settings such that when the receiver is switched to the low gain setting the strength of intermodulation products is reduced in relation to the strength of a desired signal. A detector is provided for detecting a sync code in the received signal to establish synchronization and generating a sync-absence signal if the sync code is not detected during an expected time interval. The receiver is initially switched to the high gain setting. In response to a first generation of the sync-absence signal, the pager recognizes that it is adversely affected by intermodulation products and switches the receiver to the low gain setting so that the signal-to-noise ratio of the desired signal is improved. In response to a second generation of the sync-absence signal, the pager recognizes that the amplification gain of the receiver is not sufficient, and the receiver is switched to the high gain setting.

According to a specific aspect of this invention, an alert tone is generated when an address code contained in the received signal matches the address assigned to the pager following the detection of a sync code by the detector. The receiver is switched to the low gain setting if the sync-absence signal is generated more than once following the generation of the alert tone, and subsequently switched to the high gain setting if the sync-absence signal is generated more than once during the time the receiver is being switched to the low gain setting.

BRIEF DESCRIPTION OF THE DRAWINGS

The present invention will be described in further detail with reference to the accompanying drawings, in which:

FIG. 1 is a block diagram of a radio pager of the present invention;

FIG. 2 is an illustration showing the frame structure of a signal received by the pager.

DETAILED DESCRIPTION

Figure 3A:
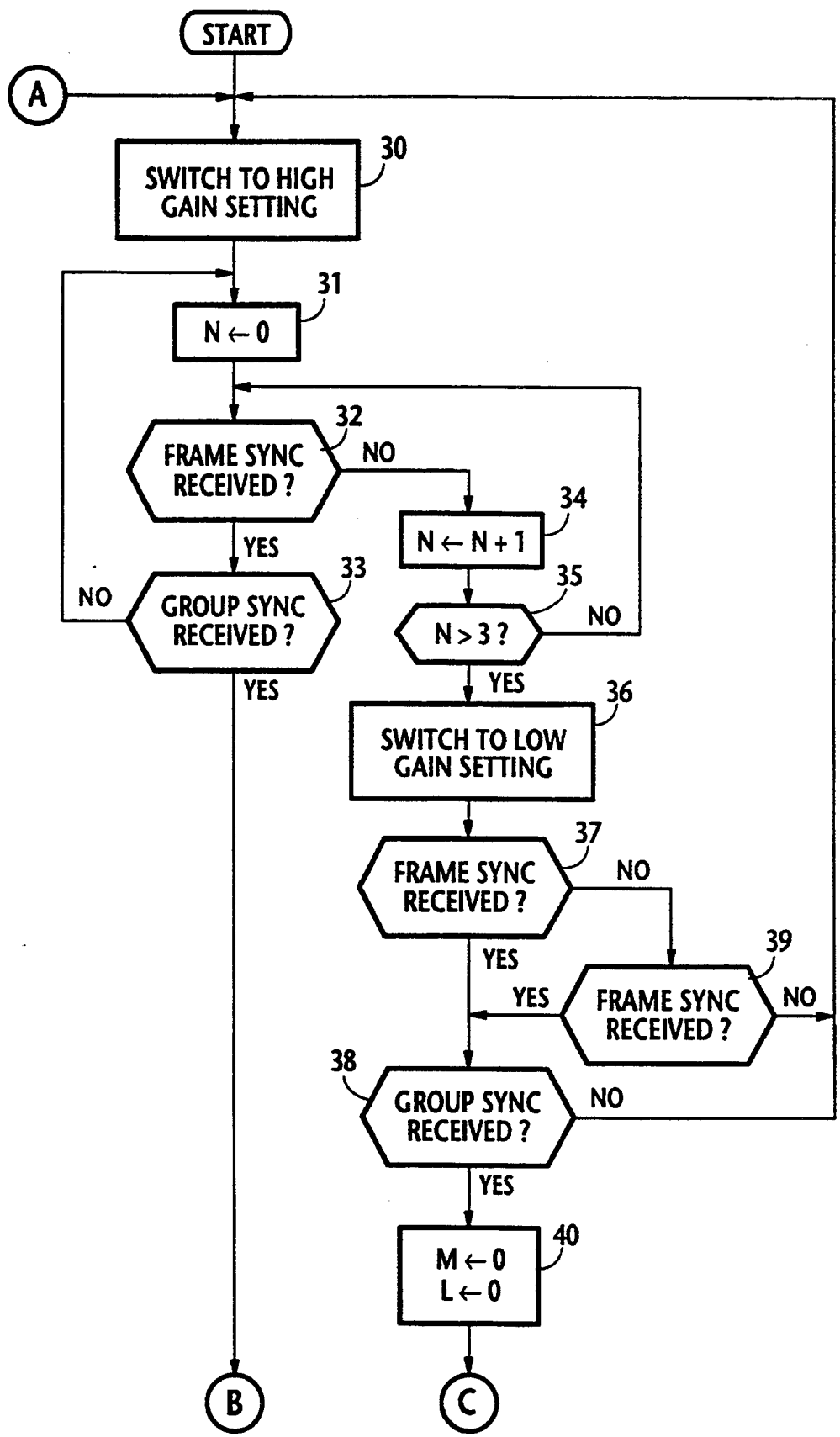
FIGS. 3A, 3B and 3C are flowcharts of instructions programmed in the controller of FIG. 1.

Referring to FIG. 1, there is shown a radio pager according to the present invention. The pager is receiving a signal having a frame format. As illustrated in FIG. 2, the signal is organized into a sequence of frames each containing fifteen subframes or "groups" G1 through G15. Each subframe has a frame sync field "FS" for establishing frame synchronization at the start of the frame, a group sync field "GS" for identifying the subframe and data fields #1 through #6 in which selective calling address codes are inserted, respectively. The signal is transmitted in the known BCH format for error detection and correction at the pager.

The radio pager includes an antenna 1 for detecting the transmitted frames, and a radio-frequency amplifier stage 2 which is coupled to the antenna and followed by a known demodulation and waveshaping circuit 3. The output of demodulation and waveshaping circuit 3 is coupled to a synchronizer 4 and a sync detector 5 which detects frame and group sync codes. Synchronizer 4 cooperates with the sync detector to establish frame and group synchronization. Sync detector 5 generates a frame-sync presence signal and a group-sync presence signal if it properly receives the frame and group sync codes and generates a frame-sync absence signal and group-sync absence signal if it fails to detect these sync codes during time intervals in which they are expected to arrive. These signals are applied to a microprocessor-based controller 8 in which they are utilized to generate a high- or low-gain control signal in a manner to be described and applies the control signal to an output terminal 8a.

The output of synchronizer 4 is connected to a known BCH decoder 6 which decodes the incoming signal and compares address codes contained in the received subframe with the address of the pager stored in a programmable read-only memory 7. If the stored address matches one of the received address codes, decoder 6 informs this fact to controller 8 and a loudspeaker 10 is activated through amplifier 9 to alert the user.

According to the present invention, a variable gain setting circuit 11 is connected to the front end of the pager. Gain setting circuit 11 comprises a switching transistor 11a with its emitter being grounded and its collector being coupled in series with a current-limiting resistor 11d to a circuit junction between antenna 1 and amplifier 2. The base of transistor 11a is connected to ground by a biasing resistor 11c and to the output terminal 8a of the controller.

One end of the antenna 1 is coupled to ground and the other end is coupled to ground through a trimming capacitor 1a, the trimming capacitor being connected through a coupling capacitor 2a of amplifier stage 2 to the base of a transistor 2b whose emitter is grounded. The collector of transistor 2b is coupled through a coil 2e and a resistor 2f to a voltage source, and a resistor 2c is connected to shunt the resistor 2e and the base-collector path of transistor 2b.

If controller 8 generates a high-gain setting signal, the potential at output terminal 8a is low and transistor 11a is turned off, allowing the signal across the trimming capacitor 1a to be coupled with a minimum of loss so that the pager is switched to a high-gain setting. If controller 8 generates a low-gain control signal, the potential at terminal 8a is high and transistor 11a is turned on, causing part of the received energy to pass to ground so that the pager is switched to a low-gain setting.

The operation of the controller 8 will now be described with reference to FIGS. 3A, 3B and 3C.

In FIG. 3A, the program execution starts with step 30 which sets the pager at high level gain for normal reception by applying a low potential to gain setting circuit 11. Exit then is to step 31 to initialize a variable N to 0. In steps 32 and 33 decision is made on whether a frame sync code and a group sync code are successively received by checking the output of sync detector 5. If a frame-sync presence signal and a group-sync presence signal are supplied controller 8 from sync detector 5, control advances to step 41 (FIG. 3B). If a frame sync is detected but a group sync is not subsequently detected, control branches at step 33 to step 31 to repeat the process.

If frame sync is not detected in decision step 32, control branches to step 34 to increment the variable N by one and goes to step 35 to check to see if N is greater than a prescribed value, say, 3. If the answer is negative, control branches to step 32 to repeat the process, and if it is affirmative, control interprets that frame sync codes have been disrupted by the effect of an intermodulation product (particularly, third-order IM product) of a desired and undesired signals, and branches to step 36 to switch the amplifier gain setting to low by applying a high potential to the gain setting circuit 11. Since intermodulation products arise due to the passing of two or more signals of different frequencies through a nonlinear device of the pager, the switching of the gain to low level setting causes the undesired strong signals to be suppressed and allows favorable reception of the desired weaker signal. Note that the amplifier gain at the low level setting is calculated so that the signal-to-noise ratio is improved at least 20 dB at desired frequency in comparison with that obtained at the high level setting.

Figure 3B:
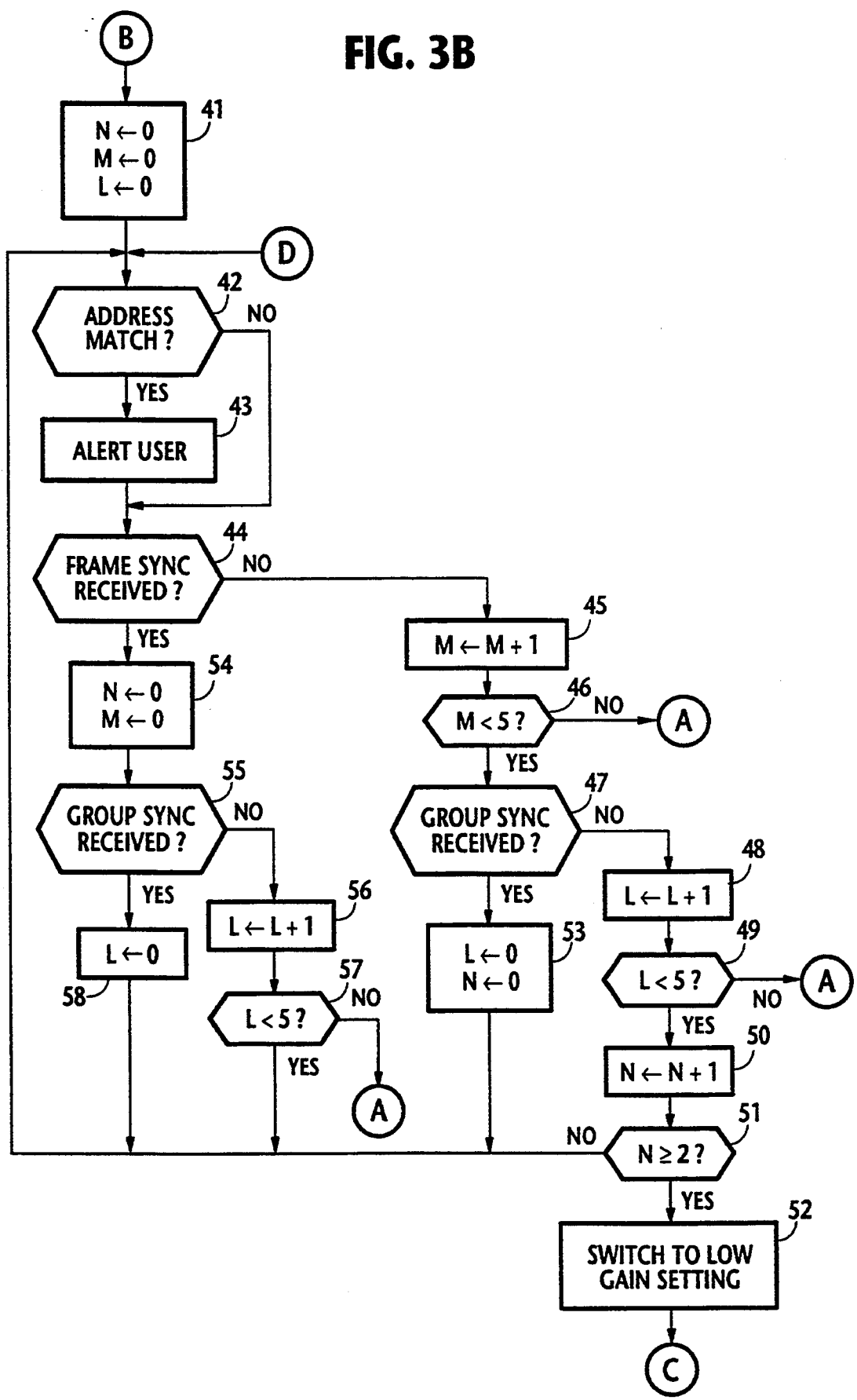
Figure 3C:
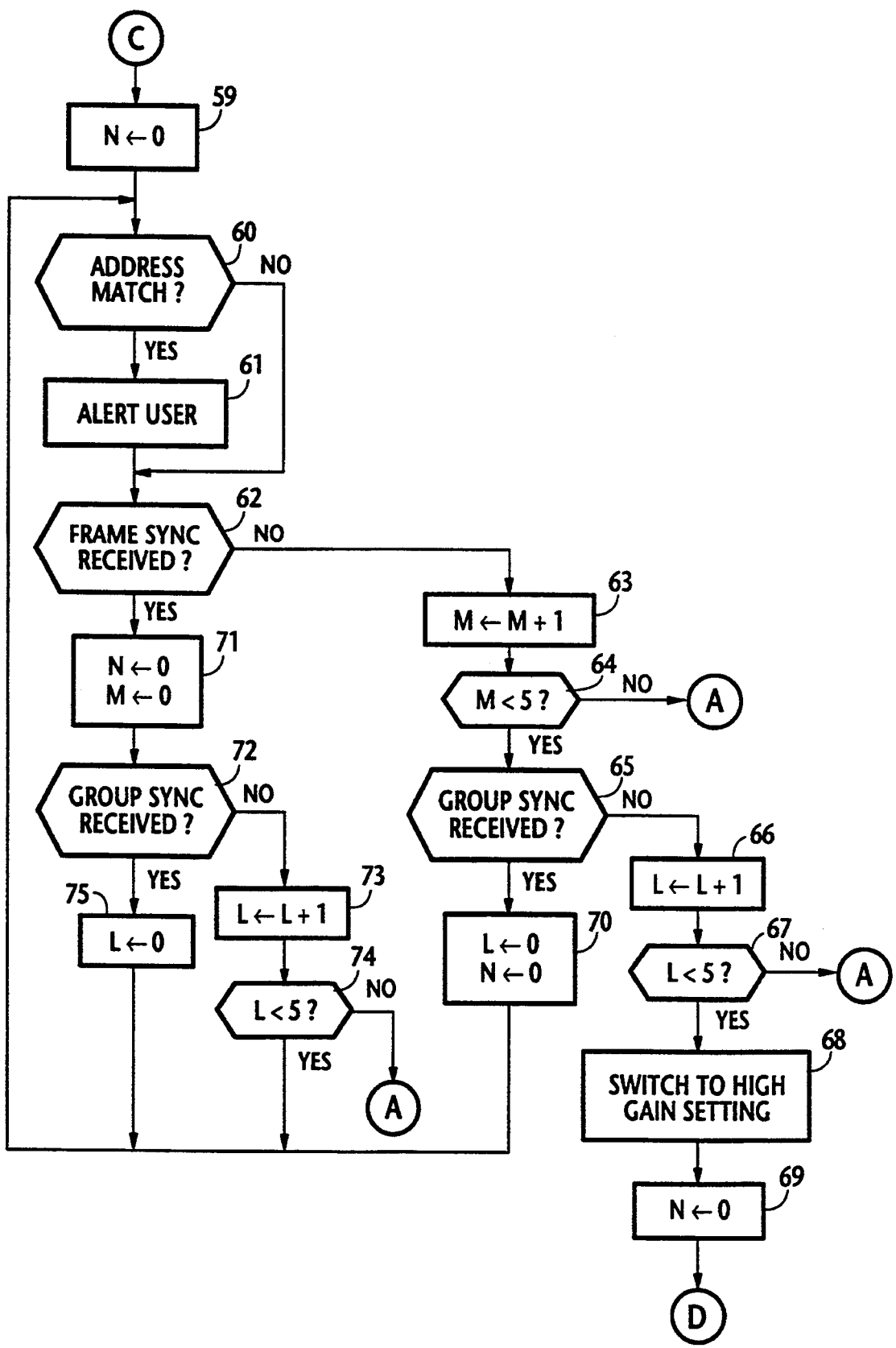

If frame and group sync codes are successively received with the low gain setting (steps 37, 38), control advances to step 40 to initialize both variables M and L to 0 and goes to step 59 (FIG. 3C). If either of the frame and group sync codes is not detected with the low gain setting (steps 37, 38, 39), control returns to step 30 to repeat the above process.

If frame and group sync codes are successively received with the high gain setting, control exits to step 41 (FIG. 3B) in which variables N, M and L are initialized to 0. Exit then is to step 42 to determine if there is a match between the pager's address and a received address code by checking the output of decoder 6. If the answer is affirmative, control branches at step 42 to step 43 to generate an alert tone for coupling to the loudspeaker 10. Exit from step 43 and from the negative decision branch of step 42 is to step 44 to check for the presence of a frame sync. If the answer is negative, control branches to step 45 to increment variable M by 1 and moves on to step 46 to check to see if variable M is smaller than a prescribed value, say, 5. If $M \geq 5$, control branches at step 46 and returns to the starting point of the program. If $M<5$, control branches at step 46 to step 47 to check for the presence of a group sync code. If the answer is negative, control branches at step 47 to step 48 to increment variable L by 1 and proceeds to step 49 to check to see if variable L is smaller than 5. If $L \geq 5$, control branches at step 49 and returns to the starting point of the program. If $L<5$, control branches at step 49 to step 50 to increment variable N by 1 and proceeds to step 51 to check to see if N is equal to or greater than 2. If $N<2$, control returns to step 42, and if $N \geq 2$, control branches at step 51 to step 52 to switch the amplifier gain to low setting.

Therefore, if the pager fails to receive a frame sync code and a group sync code in sequence with the high gain setting following the detection of a page, control will pass through steps 44 to 51 and branch at step 51 to step 42 to repeat the process. If such an event is repeated, N becomes equal to 2 and control branches at step 51 to step 52 to reduce the amplifier gain, with control recognizing that the loss of the synchronization codes is due to the presence of intermodulation products.

If, in the process of FIG. 3B, the pager fails to receive less than five frame sync codes in sequence and a group code is subsequently received, control branches at step 47 to step 53 to initialize variables L and M to 0, and returns to step 42. If, in the process of FIG. 3B, a frame sync code is once detected (step 44), control branches to step 54 to initialize variables N and M to 0, and proceeds to step 55 to check for the presence of a group sync code. If there is none, control branches at step 55 to step 56 to increment variable L by 1 and proceeds to step 57 to check to see if variable L is smaller than 5. If $L \geq 5$, control branches at step 57 and returns to the starting point of the program and if $L<5$, control returns to step 42. If the answer at step 55 is affirmative, control branches to step 58 to initialize variable L to 0 and control returns to step 42.

With the low amplifier gain setting (following step 52, FIG. 3B or initialization step 40, FIG. 3A), control now enters a subroutine shown in FIG. 3C, which is generally similar to that shown in FIG. 3B, for receiving a subsequent page. This subroutine begins with step 59 (FIG. 3C) which initializes variable N to 0. Exit then is to step 60 to make a further determination on whether there is a match between the pager's address and a received address code. If the answer is affirmative, control branches at step 60 to step 61 to generate an alert tone for coupling to the loudspeaker 10. Exit from step 61 and from the negative decision branch of step 60 is to step 62 to check for the presence of a frame sync. If the answer is negative, control branches at step 62 to step 63 to increment variable M by 1 and moves on to step 64 to check to see if variable M is smaller than a prescribed value, say, 5. If $M \geq 5$, control branches at step 64 to the starting point of the program. If $M<5$, control branches at step 64 to step 65 to check for the presence of a group sync code. If the answer is negative, control branches at step 65 to step 66 to increment variable L by 1 and proceeds to step 67 to check to see if variable L is smaller than 5. If $L \geq 5$, control branches at step 67 and returns to the starting point of the program. If $L<5$, control branches at step 67 to step 68 in which the controller recognizes that the receiver's amplification gain is not sufficient and switches the receiver to high gain setting for normal reception. Control now exits to step 69 to initialize N to 0, and returns to step 42 (FIG. 3B) for receiving a subsequently transmitted page.

Therefore, if the pager fails to receive less than five frame sync codes and less than five group sync codes in sequence with the low gain setting following the detection of a page, control will pass through steps 62 to 67 and interprets the loss of the sync codes as one that has been caused by insufficient amplifier gain, and goes to step 68 to switch the amplifier gain to high setting. If the instances of no frame sync codes or no group sync codes exceed the limit (i.e., 5), control branches at step 64 or step 67 to the starting point of the program.

If an affirmative decision is made at step 65, control branches to step 70 to initialize variables L and N to 0 and returns to step 60. In addition, if the answer is affirmative at decision step 62, variables N and M are reset to 0 (step 71) and reception of a group sync code is checked (step 72). If there is none, exit is to step 73 to increment variable L by 1 and variable L is checked to see if it exceeds beyond the limit value 5 (step 74) to return to the starting point of the program if L≧5 or return to step 60 if L<5. If the answer is affirmative at step 72, control branches to step 75 to initialize L to 0 and returns to step 60.

The foregoing description shows only one preferred embodiment of the present invention for networks in which signals are transmitted in a frame sequence. The present invention could equally be as well employed in a system in which signals are transmitted in other formats such as POCSAG (Post Office Code Standardization Advisory Group) code format.

What is claimed is:

1. A radio pager adapted to receive a signal containing sync codes, comprising:
   a receiver for receiving said signal at one of high and low gain settings such that when said receiver is switched to the low gain setting the strength of intermodulation products is reduced in relation to the strength of a desired signal;
   detector means for detecting a sync code in the received signal to establish synchronization and generating a sync-absence signal if the sync code is not detected during an expected time interval; and
   control means for initially switching said receiver to the high gain setting, switching the receiver to the low gain setting in response to a first generation of the sync-absence signal, and subsequently switching the receiver to the high gain setting in response to a second generation of the sync-absence signal.

2. A radio pager adapted to receive a signal containing sync codes and address codes, comprising:
   a receiver for receiving said signal at one of high and low gain settings such that when said receiver is switched to the low gain setting the strength of intermodulation products is reduced in relation to the strength of a desired signal;
   detector means for detecting a sync code in the received signal to establish synchronization and detecting an address match between an address code contained in the received signal and an address code assigned to the radio pager, said detector means generating a sync-presence signal if the sync code is detected and a sync-absence signal if the sync code is not detected during an expected time interval; and
   control means for initially switching (30) said receiver to the high gain setting, generating (43) an alert tone in response to said address match following a generation of the sync-presence signal by the detector means, switching (52) the receiver to the low gain setting if the sync-absence signal is generated more than once following the generation of said alert tone, and subsequently switching (68) the receiver to the high gain setting if the sync-absence signal is generated more than once during the time said receiver is being switched to the low gain setting.

3. A radio pager adapted to receive a signal containing sync codes and address codes, comprising:
   a receiver for receiving said signal at one of high and low gain settings such that when said receiver is switched to the low gain setting the strength of intermodulation products is reduced in relation to the strength of a desired signal;
   detector means for detecting a sync code in the received signal to establish synchronization and detecting an address match between an address code contained in the received signal and an address code assigned to the radio pager, said detector means generating a sync-presence signal if a sync code in said received signal is detected and a sync-absence signal if a sync code in said received signal is not detected during an expected time interval; and
   control means for initially switching (30) said receiver to the high gain setting, generating (43) a first alert tone when said address match is first detected following the generation of the sync-presence signal, switching (52) the receiver to the low gain setting if the sync-absence signal is generated more than once following the generation of said first alert tone, generating (61) a second alert tone when said address match is further detected during the time said receiver is being switched to the low gain setting, and switching (68) the receiver to the high gain setting if the sync-absence signal is generated more than once following the generation of the second alert tone.

4. In a radio pager adapted to receive a signal containing sync codes, the pager comprising a receiver for receiving said signal at one of high and low gain settings such that when said receiver is switched to the low gain setting the strength of intermodulation products is reduced in relation to the strength of a desired signal, and detector means for detecting a sync code in the received signal to establish synchronization and generating a sync-absence signal if the sync code is not detected during an expected time interval, a method for controlling the gain of said receiver comprising the steps of:
   a) initially switching said receiver to the high gain setting;
   b) switching the receiver to the low gain setting if the sync-absence signal is generated following the switching of the receiver to the high gain setting by the step (a); and
   c) switching the receiver to the high gain setting if the sync-absence signal is generated more than once following the switching of the receiver to the low gain setting by the step (b).

5. In a radio pager adapted to receive a signal containing sync codes and address codes, the pager comprising a receiver for receiving said signal at one of high and low gain settings such that when said receiver is switched to the low gain setting the strength of intermodulation products is reduced in relation to the strength of a desired signal, and detector means for detecting a sync code in the received signal to establish synchronization and detecting an address match between an address code contained in the received signal and an address code assigned to the radio pager, said detector means generating a sync-presence signal when the sync code is detected and a sync-absence signal when the sync code is not detected during an expected time interval, a method for controlling the gain of said receiver comprising the steps of:

a) initially switching said receiver to the high gain setting;
b) generating an alert tone when said address match is detected following the generation of the sync-presence signal;
c) switching the receiver to the low gain setting if the sync-absence signal is generated more than once following the generation of the alert tone by the step (b); and
d) switching the receiver to the high gain setting if the sync-absence signal is generated more than once following the switching of the receiver to the low gain setting by the step (c).

6. In a radio pager adapted to receive a signal containing sync codes and address codes, the pager comprising a receiver for receiving said signal at one of high and low gain settings such that when said receiver is switched to the low gain setting the strength of intermodulation products is reduced in relation to the strength of a desired signal, and detector means for detecting a sync code in the received signal to establish synchronization and detecting an address code contained in the received signal which matches an address code assigned to the radio pager, said detector means generating a sync-presence signal indicating that a sync code is detected and a sync-absence signal indicating that a sync code is not detected during an expected time interval, a method for controlling the gain of said receiver comprising the steps of:
a) initially switching said receiver to the high gain setting;
b) generating a first alert tone if said address match is first detected following the generation of the sync-presence signal;
c) switching the receiver to the low gain setting if the sync-absence signal is generated more than once following the generation of the first alert tone by the step (b);
d) generating a second alert tone when said address match is further detected following the switching of the receiver to the low gain setting by the step (c); and
e) switching the receiver to the high gain setting if the sync-absence signal is generated more than once following the generation of the second alert tone by the step (d).

* * * * *

UNITED STATES PATENT AND TRADEMARK OFFICE
CERTIFICATE OF CORRECTION

PATENT NO. : 5,369,799
DATED : November 29, 1994
INVENTOR(S) : Tsunoda

It is certified that error appears in the above-indentified patent and that said Letters Patent is hereby corrected as shown below:

On the title page, item [73] Assignee: "Nec Corporation" should read --NEC Corpration--.

Signed and Sealed this

Eighteenth Day of April, 1995

Attest:

BRUCE LEHMAN

*Commissioner of Patents and Trademarks*

*Attesting Officer*